(12) United States Patent
Kuchimaru (10) Patent No.: US 7,443,445 B2
(45) Date of Patent: Oct. 28, 2008

(54) LENS UNIT AND IMAGE PICKUP APPARATUS

(75) Inventor: Toru Kuchimaru, Toyokawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 703 days.

(21) Appl. No.: 11/136,210

(22) Filed: May 24, 2005

(65) Prior Publication Data

US 2005/0264673 A1  Dec. 1, 2005

(30) Foreign Application Priority Data

May 28, 2004  (JP)  ............................. 2004-160228

(51) Int. Cl.
  *H04N 5/225* (2006.01)
  *H04N 5/262* (2006.01)
(52) U.S. Cl. .................. 348/374; 348/294; 348/240.99
(58) Field of Classification Search ................. 348/373, 348/374, 375
See application file for complete search history.

(56) References Cited

U.S. PATENT DOCUMENTS

| | | | |
|---|---|---|---|
| 4,110,005 A * | 8/1978 | Bohm et al. ................. 359/673 |
| 5,592,250 A * | 1/1997 | Shimizu ....................... 396/79 |
| 6,067,421 A * | 5/2000 | Kitazawa et al. ............ 396/133 |
| 7,342,606 B2 * | 3/2008 | Suh .......................... 348/240.3 |
| 2005/0046736 A1 * | 3/2005 | Kuchimaru ................. 348/340 |

FOREIGN PATENT DOCUMENTS

| | | |
|---|---|---|
| JP | 58-111004 | 7/1983 |
| JP | 03-131828 | 6/1991 |
| JP | 04-315113 | 11/1992 |
| JP | 5-45619 | 6/1993 |

(Continued)

OTHER PUBLICATIONS

"Notification of Reasons for Refusal," (Office Action) for Japanese Patent Application No. 2004-160228, issued Apr. 13, 2006, 6 pages.

(Continued)

*Primary Examiner*—Lin Ye
*Assistant Examiner*—Hung H Lam
(74) *Attorney, Agent, or Firm*—Brinks Hofer Gilson & Lione (57) ABSTRACT

A lens unit of the present invention has a mounting cradle, a lens frame holding portion fixed to a mounting cradle in an optical axis direction, a lens frame which is held to the lens frame holding portion to be capable of moving to the optical axis direction, and a lens group fixed to the lens frame. The lens unit further has an adjusting screw provided parallel with the optical axis direction, a nut which is provided to the adjusting screw and whose position with respect to the mounting cradle is fixed, a cam portion which is fixed to the lens frame and is engaged with the adjusting screw, and a switching lever which is provided between the nut and the cam portion so as to be capable of rotationally moving about the adjusting screw, on the outside of the lens frame holding portion. A position of the lens frame in the optical axis direction is switched between a standard photographing position and a micro photographing position by rotational movement of the switching lever.

14 Claims, 9 Drawing Sheets

FOREIGN PATENT DOCUMENTS

| | | |
|---|---|---|
| JP | 07-067002 | 3/1995 |
| JP | 10-170809 | 6/1998 |
| JP | 11-305104 | 11/1999 |
| JP | 2003-043332 | 2/2003 |
| JP | 2003-185906 | 7/2003 |
| JP | 2003-337279 A | 11/2003 |
| JP | 2004-252230 | 9/2004 |

OTHER PUBLICATIONS

"Decision for Refusal," (Office Action) for Japanese Patent Application No. 2004-160228, issued Aug. 2, 2006, 6 pages.

* cited by examiner

LENS UNIT AND IMAGE PICKUP APPARATUS

The present application claims priority to Japanese Patent Application No. 2004-160228 filed in May 28, 2004, the entire content of which is hereby incorporated by reference.

BACKGROUND OF THE INVENTION

1. Field of the Invention

The present invention relates to a lens unit for a camera. More concretely, the present invention relates to the lens unit in which a lens can be moved to its optical axis direction in order to switch between a standard photographing position and a macro photographing position.

2. Description of the Related Art

Conventionally, in lens units to be used for cameras or the like, all or some of a plurality of lenses can be moved manually or automatically to an optical axis direction in order to adjust focus or the like. Cameras in which an adjustment is made manually are generally provided with a ring-shaped focus ring on an outer periphery of a lens frame for holding the lens, and the focus ring is rotated to adjust the focus. The rotation of the focus ring is converted into a movement of the lens frame to the optical axis direction by a mechanism such as a screw or a cam, so that the lens is moved to the optical axis direction (for example, Japanese Utility Model Application Laid-Open No. (5-45619)).

The lens units to be used for cameras which are capable of switching between the standard photographing mode and the macro photographing mode generally have a lever or the like for switching an arrangement of the lens frame between the standard photographing position and the macro photographing position. When the lever is operated, the lens frame advances or retreats to the optical axis direction by a predetermined distance via the mechanism such as a screw or a cam (for example, Japanese Patent Application Laid-Open No. 2003-337279). In such lens units, a ring-shaped member having a cam portion or a screw portion is provided to a periphery of the lens frame, and the ring-shaped member is engaged with the cam portion or the screw portion provided to the outer periphery of the lens frame. The ring-shaped member is rotated by a lever or the like, so that the lens position is adjusted. A spring or the like, which always biases the lens frame to a predetermined direction, is provided to the periphery of the lens frame.

In the conventional lens units, however, the ring-shaped member which has the cam portion and the screw portion for switching the position of the lens frame is provided over the entire periphery of the lens frame. Further, a coil spring or the like which is wound around the outer periphery of the lens frame is occasionally provided in order to bias the lens frame to a predetermined direction. For this reason, a space where the members are arranged should be provided to the periphery of the lens frame, and thus a projecting area in the optical axis direction of the entire lens unit tend to become large. Particularly lens units for miniature cameras to be mounted on mobile devices or the like are required to be further miniaturized.

SUMMARY OF THE INVENTION

It is a main object of the present invention to provide a lens unit in which a projecting area in an optical axis direction is further reduced.

It is another object of the present invention to provide a small-size lens unit which is capable of carrying out switching between a standard photographing position and a macro photographing position.

In order to achieve these objects and another object, from a certain aspect of the present invention, a lens unit includes:

a mounting cradle;

a cylindrical portion in an optical axis direction fixed to the mounting cradle;

a lens frame held to the cylindrical portion to be capable of moving to the optical axis direction;

a lens fixed to the lens frame;

an adjusting shaft provided to an outside of the cylindrical portion in parallel with the optical axis direction;

a position standard member that is provided to the adjusting shaft and whose position with respect to the mounting cradle is fixed;

a cam member that is fixed to the lens frame and is engaged with the adjusting shaft; and a switching member provided between the position standard member and the cam member so as to be capable of rotationally moving about the adjusting shaft, wherein a position of the lens frame in the optical axis direction is switched by the rotational movement of the switching member.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawing.

DETAILED DESCRIPTION OF THE PREFERRED EMBODIMENTS

First Embodiment

A first embodiment where the present invention is concretized is explained in detail below with reference to the accompanying drawings. In the first embodiment, the present invention is applied to a lens unit to be used in an image pickup apparatus of a cellular phone handset, a digital camera and the like.

Figure 1:
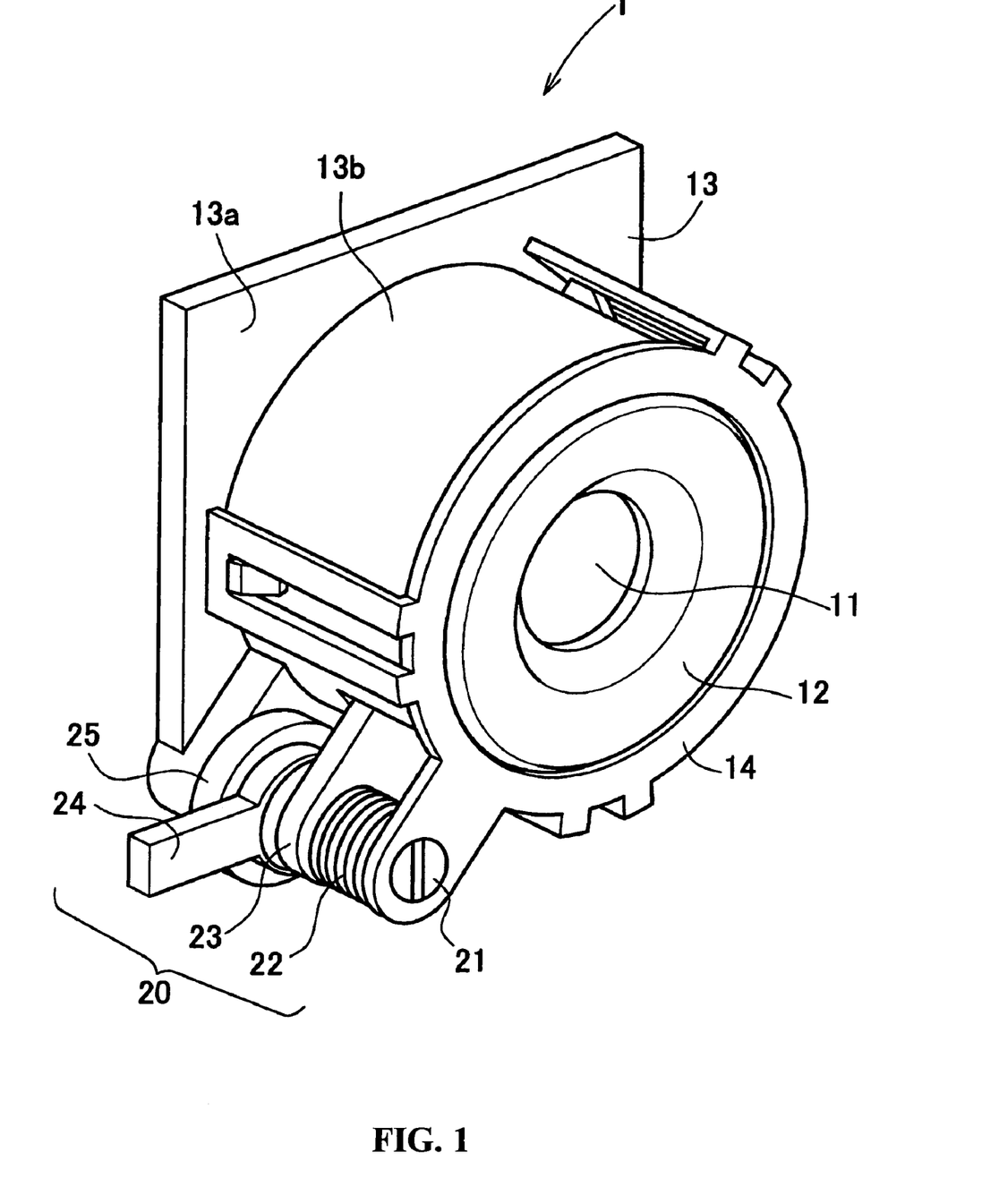
FIG. 1 is a perspective view of a lens unit according to a first embodiment.
Figure 2:
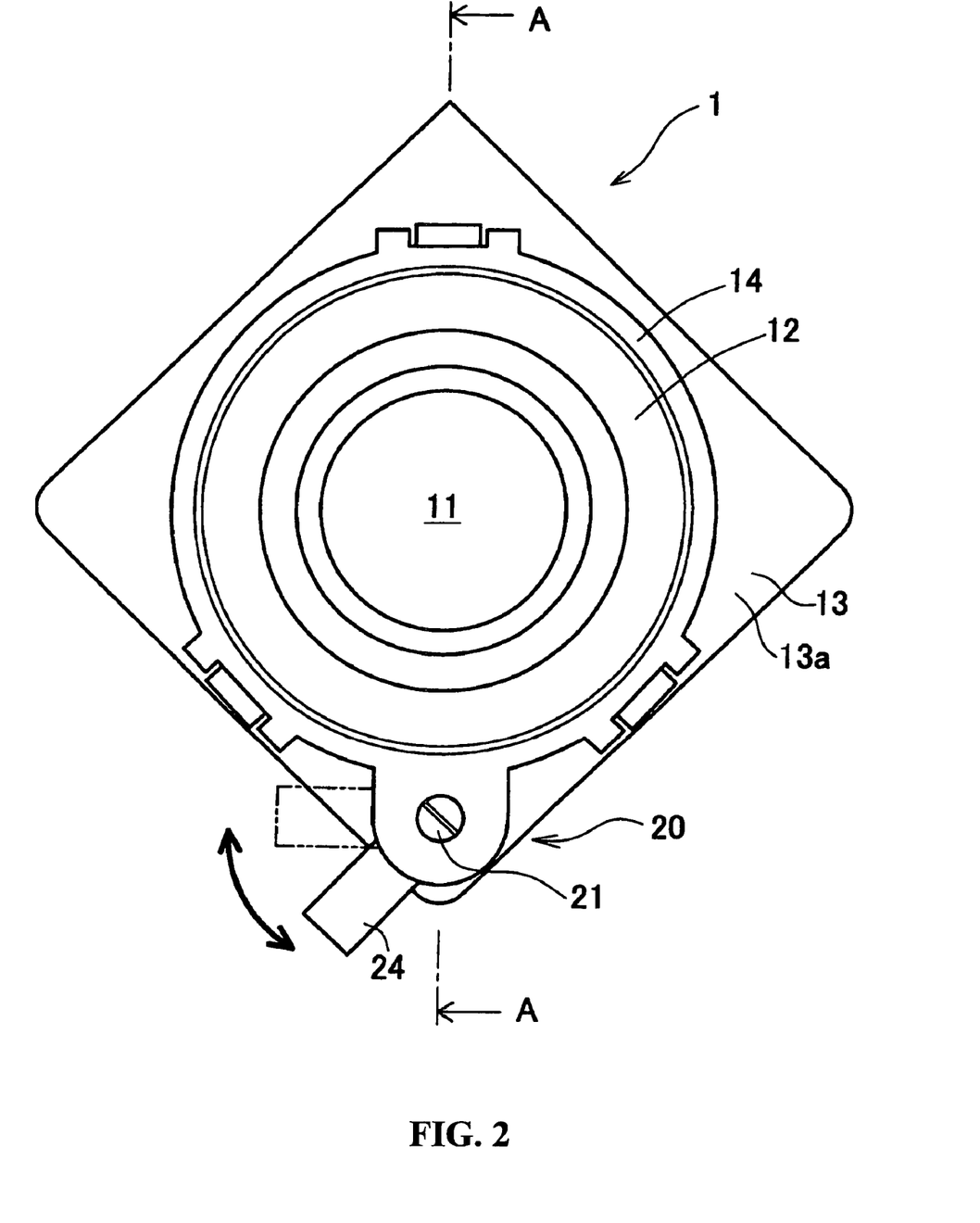
FIG. 2 is a plan view of the lens unit according to the first embodiment.

The lens unit 1 according to the first embodiment, as shown in FIGS. 1 to 2, has a lens group 11 where a plurality of optical lenses are combined, a lens frame 12 that holds the respective lenses of the lens group 11 in a predetermined arrangement, and a mounting cradle 13 that holds an image sensor or the like. The mounting cradle 13 is constituted so that an approximately quadrate pedestal portion 13a and an approximately cylindrical lens frame holding portion 13b are formed integrally. The lens frame 12 is fitted into an inner periphery of the lens frame holding portion 13b. An approximately circular cover 14 is provided to a forward end (front side in FIG. 1) of the lens frame holding portion 13b and is locked to an outer peripheral surface of the lens frame holding portion 13b. A right-front side in FIG. 1 is an object side, and hereinafter the object side is called the front side and the image-pickup side is called the rear side.

A CCD unit 15 (see FIG. 3) including the image sensor such as CCD is held to the rear side of the pedestal portion 13a of the mounting cradle 13. In general, a projecting shape of the CCD unit 15 in an optical axis direction is approximately quadrate, and a projecting shape of the lens group 11 and the lens frame 12 in the optical axis direction is approximately circular. For this reason, as shown in FIG. 2, a certain space is formed on the outer periphery of the lens frame holding portion 13b at four corners of the pedestal portion 13a. As shown in FIG. 1, therefore, the lens unit 1 is provided with a lens position adjusting section 20 at one of the four corners of the mounting cradle 13. The lens position adjusting section 20 has an adjusting screw 21, a spring 22, a cam portion 23, a switching lever 24 and a nut 25, and all of them are sandwiched to be held between a cover 14 and the mounting cradle 13.

Figure 3:
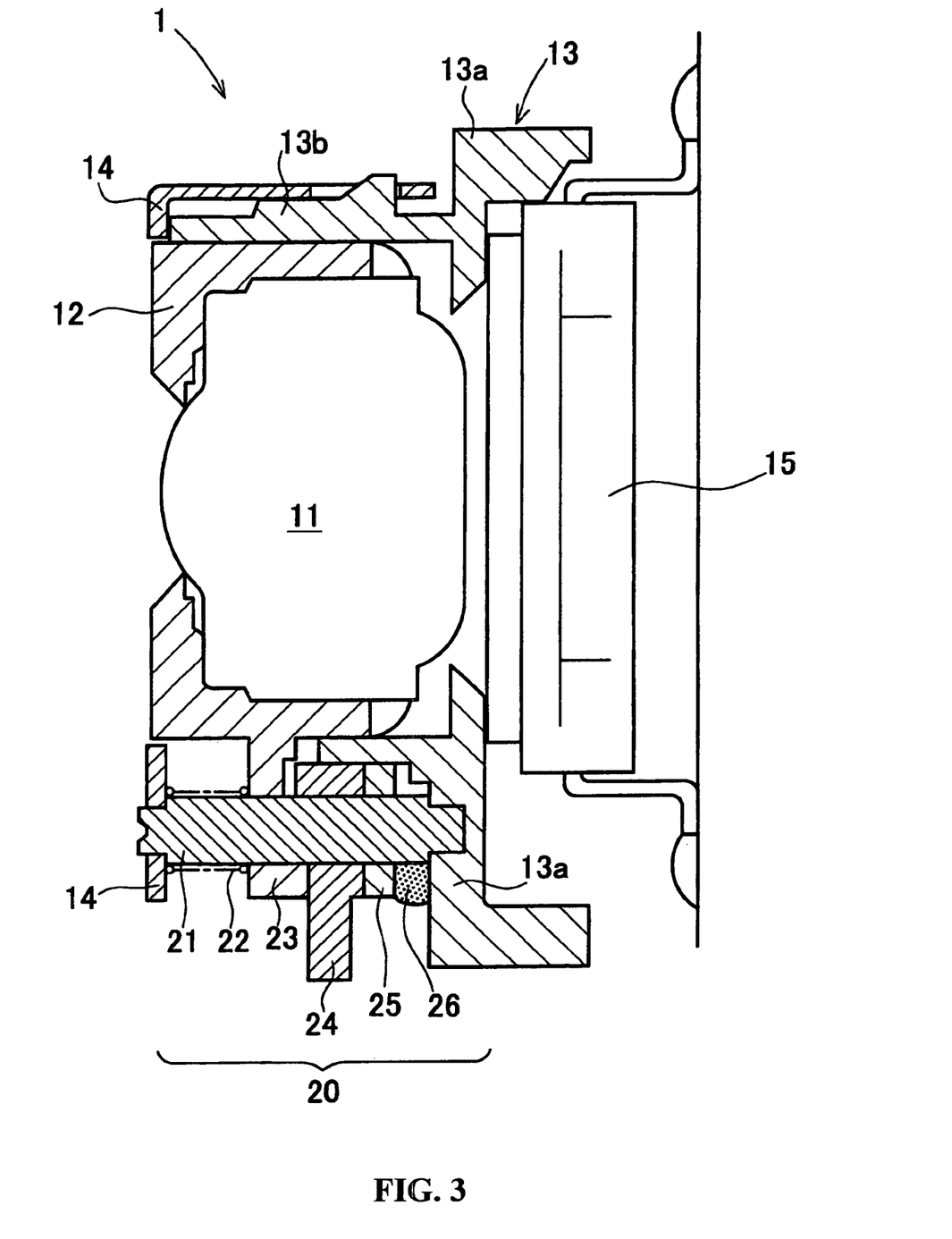
FIG. 3 is a sectional view of the lens unit in a standard state according to the first embodiment.
Figure 4:
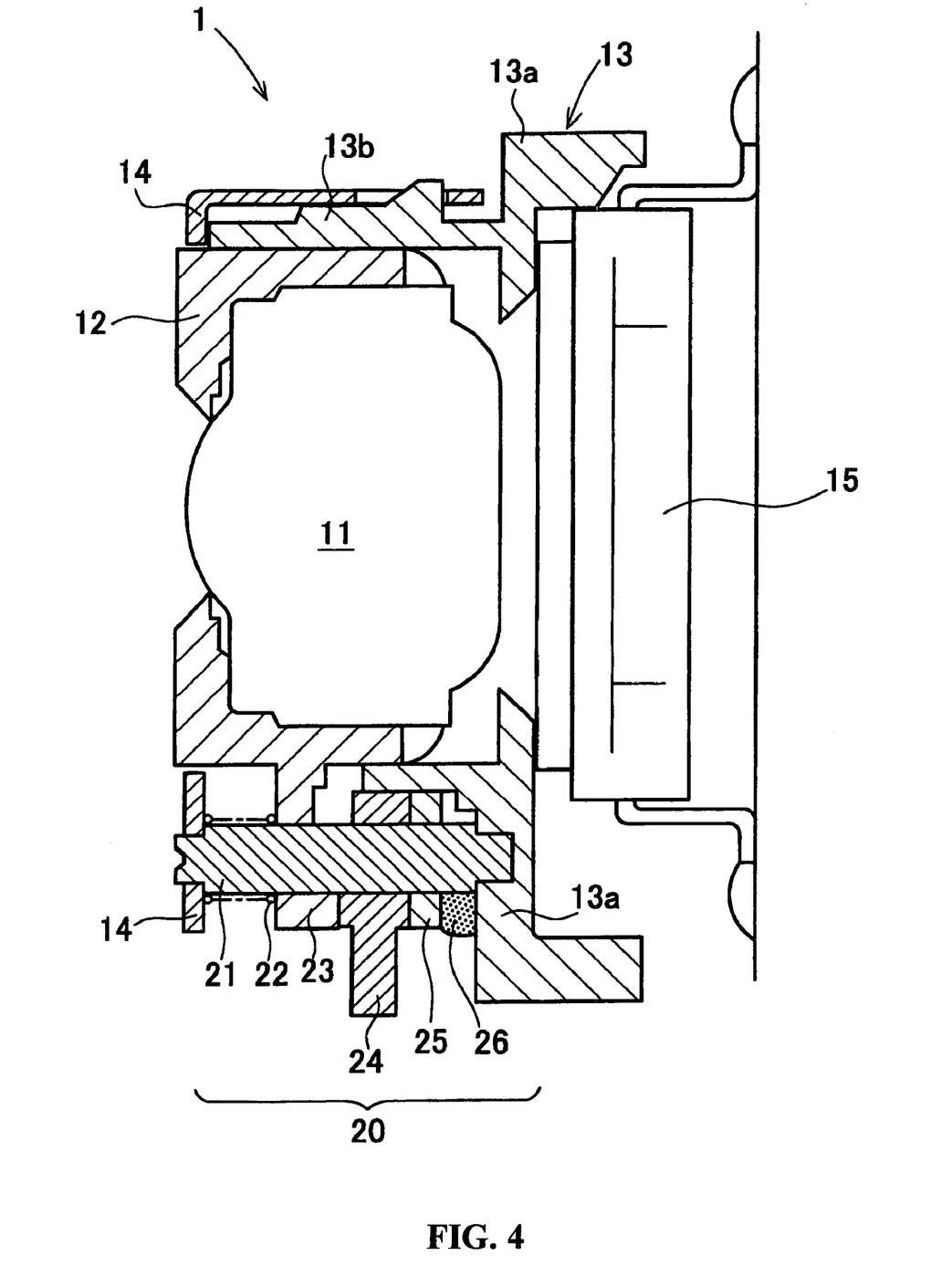
FIG. 4 is a sectional view of the lens unit in a macro state according to the first embodiment.

A constitution of the lens position adjusting section 20 is explained below with reference to FIGS. 3 and 4. FIGS. 3 and 4 illustrate a state that the lens unit 1 as well as the CCD unit 15 is set in a apparatus. FIGS. 3 and 4 are sectional views taken along line A-A of FIG. 2, and the front side of the lens unit 1 is shown on the left side. As shown in FIGS. 3 and 4, the adjusting screw 21 pierces through all the spring 22, the cam portion 23, the switching lever 24 and the nut 25. A forward end and a head portion of the adjusting screw 21 have a slightly small diameter, and the forward end is inserted into a hole provided on the pedestal portion 13a of the mounting cradle 13. Further, the head portion is protruded from a through hole provided on the cover 14 to the front side. As a result, the adjusting screw 21 is held rotatively by the mounting cradle 13 and the cover 14.

The spring 22 is inserted between the cover 14 and the cam portion 23 along an outer periphery of the adjusting screw 21, and biases the cam portion 23 to the rear side (the right direction in FIG. 3). The cam portion 23 is formed integrally with the lens frame 12, and is protruded from a notched portion provided on the lens frame holding portion 13b of the mounting cradle 13 to an outer peripheral direction. The switching lever 24 can be rotated about the adjusting screw 21 in a reciprocating manner within a range of a predetermined rotational angle (see FIG. 2).

A convex cam is provided to the rear surface of the cam portion 23 and the front surface of the switching lever 24, and when the switching lever 24 is moved rotationally, their relative arrangement is switched. The position of the lens frame 12 in the optical axis direction is in any one of two states shown in FIGS. 3 and 4 according to the position of the switching lever 24. In the state shown in FIG. 3, the convex portions of the cam portion 23 and the switching lever 24 shift from each other, and the lens frame 12 is moved to the rear side, namely, in a standard photographing position. Meanwhile, in the state of FIG. 4, the convex portions of the cam portion 23 and the switching lever 24 are overlapped with each other in the optical axis direction, and the lens frame 12 is protruded to the front side, namely, in a macro photographing position.

A male screw portion is formed on an outer peripheral surface of the adjusting screw 21 at least in a range from its touch portion to touch with the mounting cradle 13 to the vicinity of the nut 25, and is engaged with a female screw portion on an inner periphery of the nut 25. That is to say, the nut 25 can be moved to the axial direction by rotation of the adjusting screw 21. In a complete state of the lens unit 1 shown in FIGS. 3 and 4, the nut 25 is fixed to the adjusting screw 21 and the mounting cradle 13 by adhesive 26. The position of the nut 25 is adjusted and fixed at the time of manufacturing the lens unit 1.

An adjusting method at the time of manufacturing the lens unit 1 is explained below. This adjustment is made after the lens frame 12 to which the lens group 11 is fixed, the CCD unit 15, the lens position adjusting section 20 and the like are assembled in the mounting cradle 15 and before the adhesive 26 is injected. In this state, when the adjusting screw 21 is rotated and the position of the nut 25 is changed, the position of the cam portion 23 in the axial direction is changed via the switching lever 24, and thus the arrangement of the lens frame 12 in the optical axis direction can be adjusted. As a result, the position of the lens frame 12 in the optical axis direction is adjusted so that an image is formed correctly on an image forming surface of the CCD unit 15. The adhesive 26 is injected between the nut 25 and the mounting cradle 13, so that the nut 25 is fixed. As a result, the lens unit 1 is completed.

When the position of the nut 25 in the axial direction is fixed in such a manner, the switching lever 24 does not move to the axial direction in the completed lens unit 1. When the lens unit 1 is used, the switching lever 24 is moved rotationally, so that only two-tiered switching between the standard photographing position in FIG. 3 and the macro photographing position in FIG. 4 can be carried out. At the time of switching from the standard photographing position to the macro photographing position, the spring 22 is compressed by the rotational movement of the switching lever 24, and the cam portion 23, namely, the lens frame 12 is protruded to the front side. At the time of switching from the macro photographing position to the standard photographing position, the lens frame 12 retreats due to a biasing force of the spring 22 according to a reverse rotational movement of the switching lever 24.

In the lens unit 1, the lens frame 12 is inserted into the lens frame holding portion 13b of the mounting cradle 13, and the cam portion 23 as a part of the lens frame 12 pierces the adjusting screw 21. The rotation of the lens frame 12 about the optical axis is, therefore, prevented, and can be moved only to the optical axis direction. Since all the members of the lens position adjusting section 20 are overlapped in the optical axis direction so as to be arranged at the corner of the mounting cradle 13, members which are provided to conventional lens units are not provided on an entire outer periphery of the lens frame 12. Since a space which is required on the circumference of the lens frame 12 is, therefore, small, the projecting area of the entire lens unit 1 in the optical axis direction is small.

According to the lens unit 1 in the first embodiment detailed above, the lens position adjusting section 20 is provided to one of the four corners of the mounting cradle 13. That is to say, no member is provided to the entire outer periphery of the lens frame 12, thereby reducing the projecting area of the lens unit 1 in the optical axis direction. Further, the position of the lens frame 12 in the optical axis direction can be adjusted at the time of manufacturing and the switching between the standard photographing position and the macro photographing position can be carried out at the time of use by the lens position adjusting section 20. In the lens unit 1, therefore, the switching between the standard photographing position and the macro photographing position can be carried out, and the projecting area in the optical axis direction can be further reduced.

Second Embodiment

A second embodiment where the present invention is concretized is explained in detail below with reference to the accompanying drawings. The lens unit 2 according to the second embodiment has a constitution of the lens position adjusting section which is slightly different from that in the lens unit 1 according to the first embodiment. The other like portions are designated by like reference numbers, and the explanation thereof is omitted.

Figure 5:
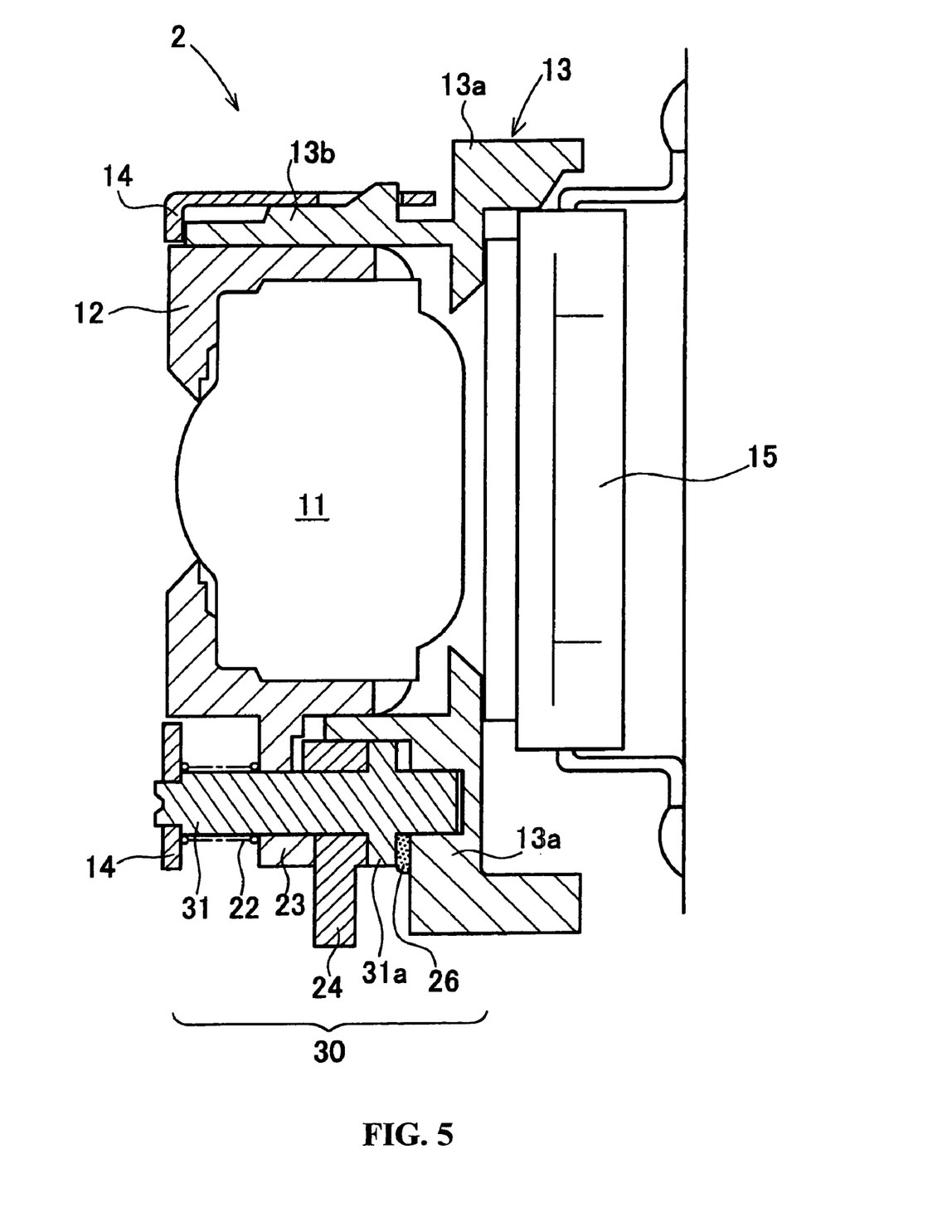
FIG. 5 is a sectional view of the lens unit in the standard state according to a second embodiment.
Figure 6:
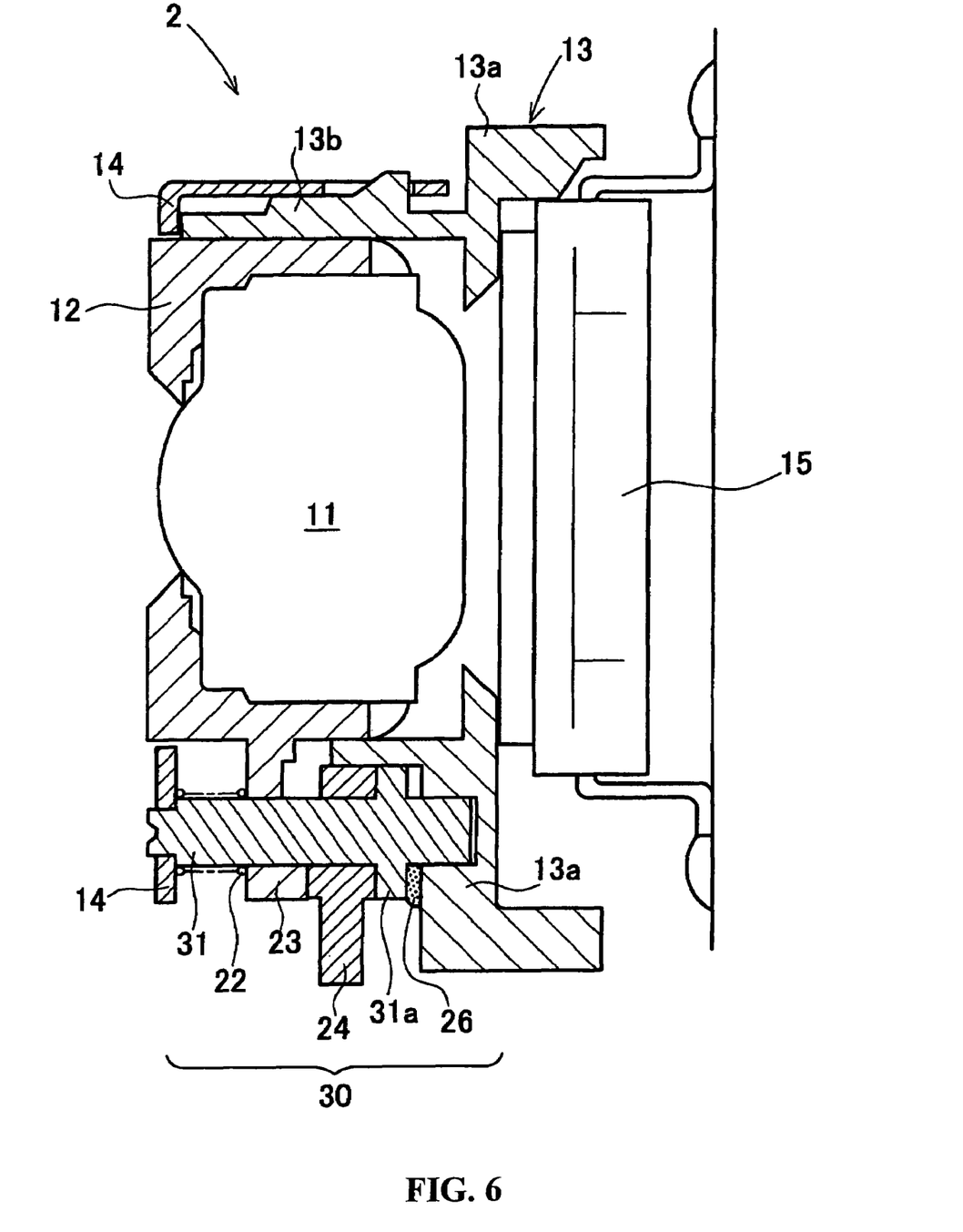
FIG. 6 is a sectional view of the lens unit in the macro state according to the second embodiment.

In the lens position adjusting section 30 of the lens unit 2 according to the second embodiment, as shown in FIGS. 5 and 6, a flange portion 31a is provided to the adjusting screw 31, and the nut 25 provided to the lens unit 1 according to the first embodiment is omitted. A male screw portion is formed on the outer periphery at the forward end of the adjusting screw 31, and is threaded into a male screw hole formed on the pedestal portion 13a of the mounting cradle 13. The lens position adjusting section 30 is provided to one of the four corners of the mounting cradle 13 similarly to the lens position adjusting section 20 according to the first embodiment.

In the lens unit 2, since the entire arrangement in the axial direction is adjusted by adjusting a threading amount of the adjusting screw 31 at the time of manufacturing, a position of the flange portion 31a in the optical axis direction can be adjusted. As a result, the arrangement of the lens frame 12 in the optical axis direction is adjusted. After the adjustment, the lens frame 12 is fixed by the adhesive 26 similarly to the first embodiment. In the completed lens unit 2, similarly to the first embodiment, the position of the lens frame 12 in the optical axis direction is switched between the two-tiered positions by the rotational movement of the switching lever 24.

As described above in detail, according to the lens unit 2 in the second embodiment, similarly to the lens unit 1 according to the first embodiment, the switching between the standard photographing position and the macro photographing position can be carried out, and the projecting area in the optical axis direction is further reduced.

Third Embodiment

A third embodiment where the present invention is concretized is explained in detail below with reference to the accompanying drawings. The lens unit 3 according to the third embodiment has the constitution of the lens position adjusting section which is slightly different from that of the lens unit 1 according to the first embodiment. The other like portions are designated by like reference numbers, and the explanation thereof is omitted.

Figure 7:
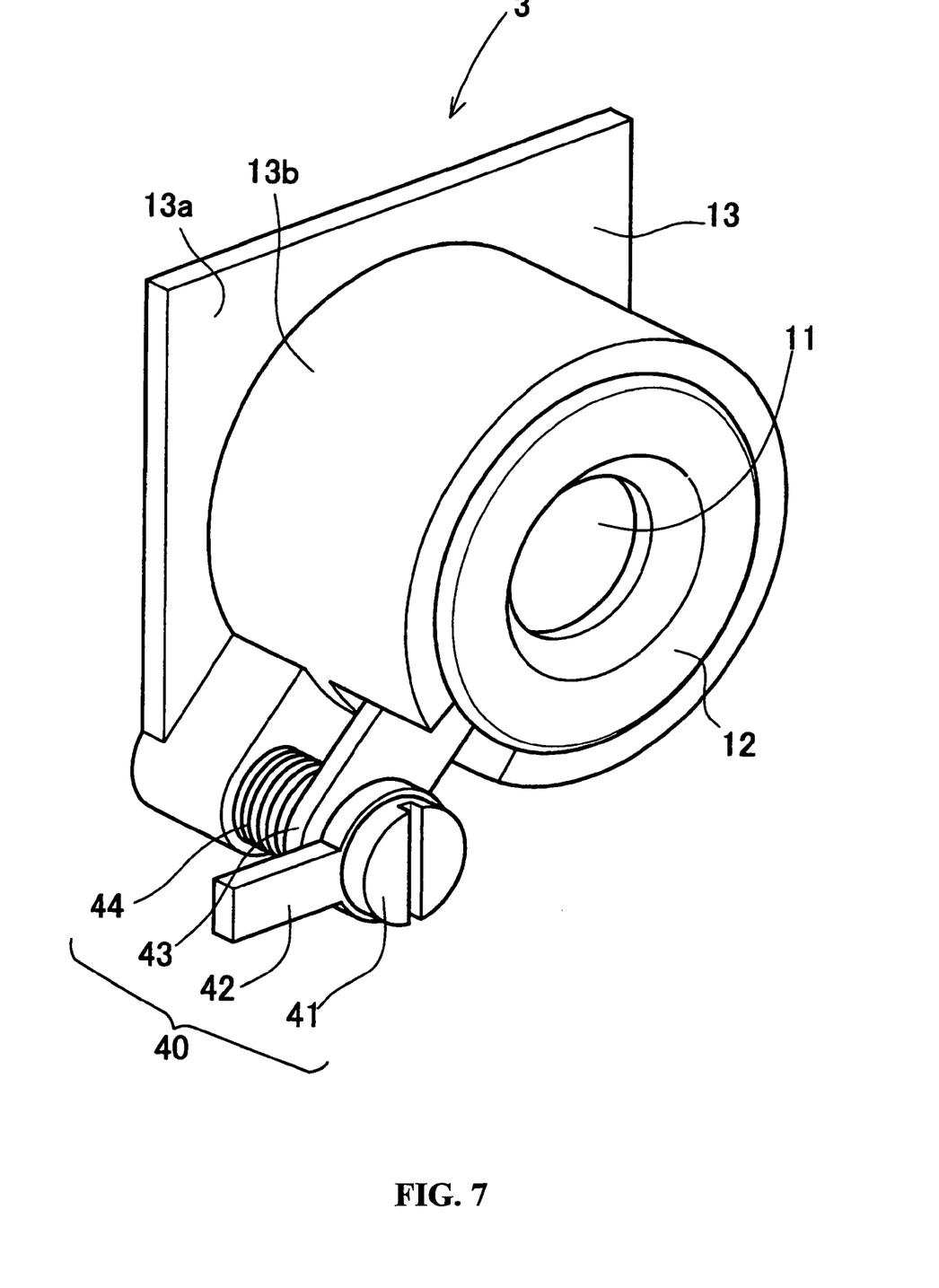
FIG. 7 is a perspective view of the lens unit according to a third embodiment.
Figure 8:
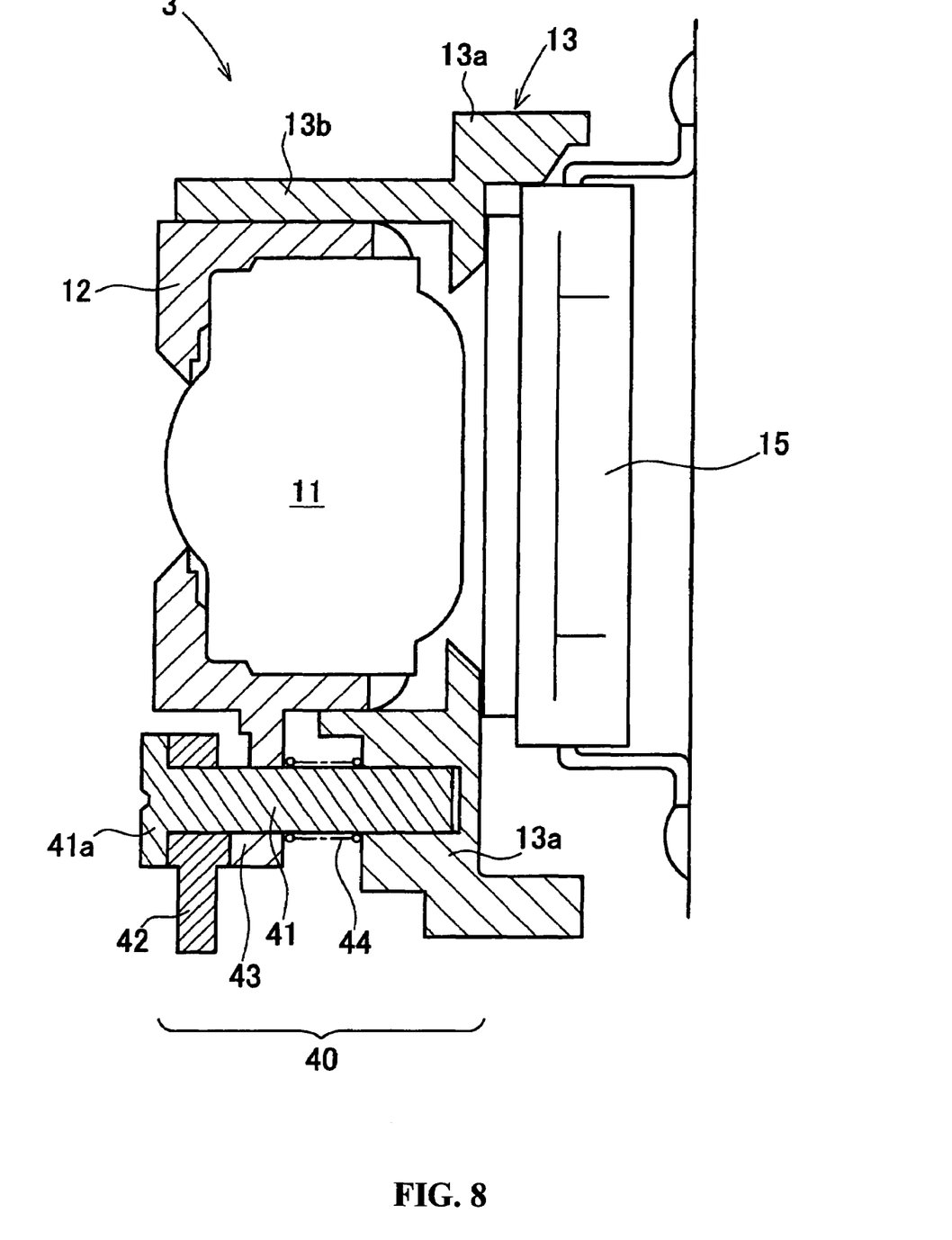
FIG. 8 is a sectional view of the lens unit in the standard state according to the third embodiment.
Figure 9:
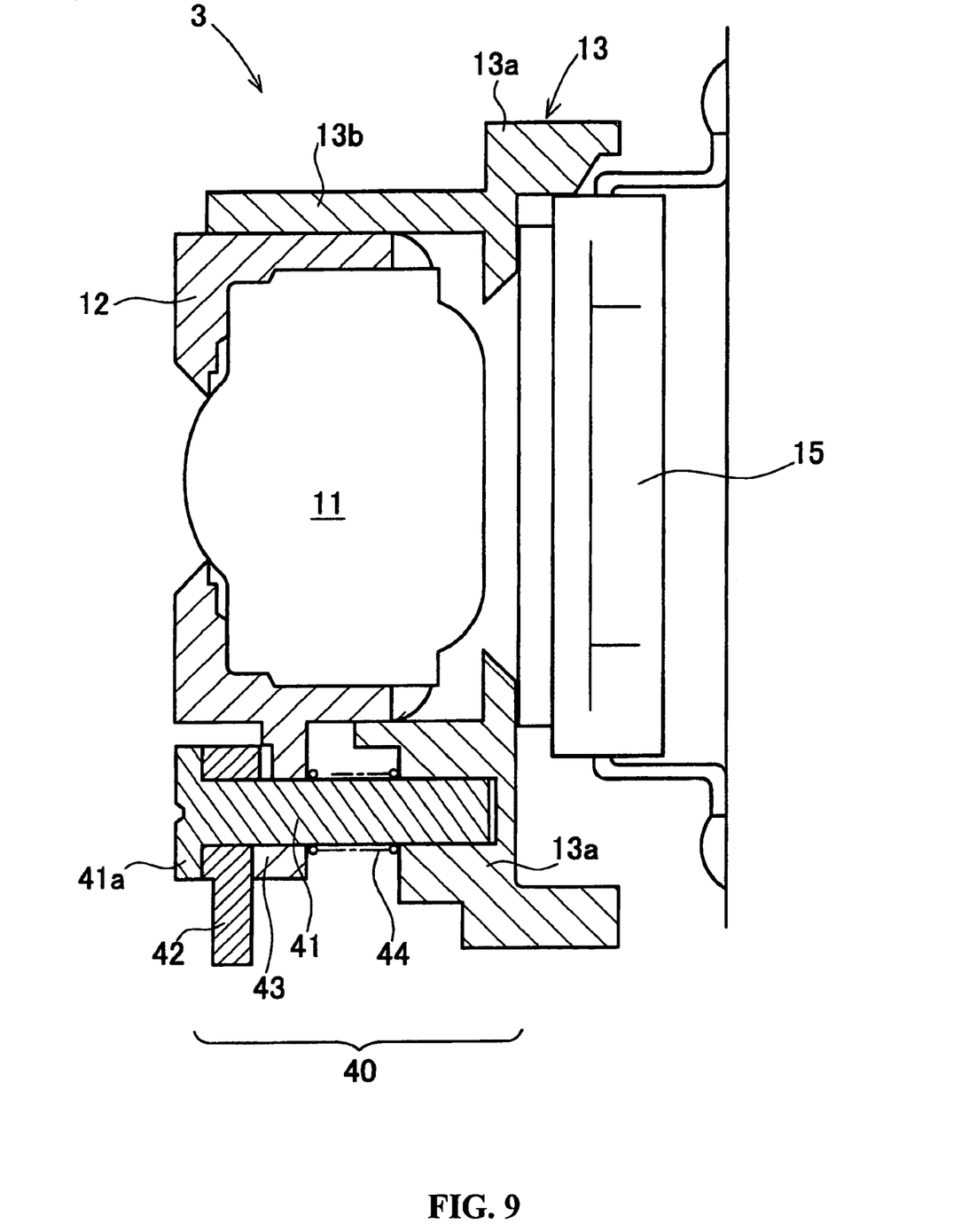
FIG. 9 is a sectional view of the unit lens in the macro state according to the third embodiment.

The lens position adjusting section 40 of the lens unit 3 according to the third embodiment has the adjusting screw 41, the switching lever 42, the cam portion 43 and the spring 44 as shown in FIGS. 7 to 9. Meanwhile, the cover 14 and the nut 25 of the lens unit 1 is not provided thereto. The adjusting screw 41 has the head portion 41a with a larger diameter than the screw portion and at least its outer peripheral surface at the forward end is formed with the male screw portion. The forward end of the male screw portion is threaded into the female screw hole formed on the pedestal portion 13a of the mounting cradle 13. The forward end of the adjusting screw 41 is fixed to the mounting cradle 13 by adhesion, welding or caulking.

The switching lever 42 touches a rear surface of the head portion 41a of the adjusting screw 41, and is arranged on the front side of the cam portion 43. A convex cam is formed on a rear surface of the switching lever 42 and a front surface of the cam portion 43. The spring 44 is arranged between the cam portion 43 and the mounting cradle 13, and biases the cam portion 43 to the front side (left side in the drawing). The lens position adjusting section 40 is provided to one of the four corners of the mounting cradle 13 similarly to the lens position adjusting section 20 according to the first embodiment.

In the lens unit 3, the entire arrangement of the adjusting screw 41 in the axial direction is adjusted by adjusting am amount of threading of the adjusting screw 41 into the mounting cradle 13 at the time of manufacturing. The position of the cam portion 43 in the optical axis direction can be, therefore, adjusted via the switching lever 42. As a result, the arrangement of the lens frame 12 in the optical axis direction is adjusted. After the adjustment, the adjusting screw 41 is fixed to the mounting cradle 13.

In the completed lens unit 3, the position of the lens frame 12 in the optical axis direction is switched between the standard photographing position shown in FIG. 8 and the macro photographing position shown in FIG. 9 by the rotation of the switching lever 42. At the time of the switching into the standard photographing position shown in FIG. 8, the convex portion of the switching lever 42 is overlapped with the convex portion of the cam portion 43, and the lens frame 12 retreats against the biasing force of the spring 44. At the time of the switching into the macro photographing position shown in FIG. 9, the convex portion of the switching lever 42 and the convex portion of the cam portion 43 shift from each other, so that the lens frame 12 is protruded to the front side by the biasing force of the spring 44.

As described above in detail, according to the lens unit 3 in the third embodiment, similarly to the lens unit 1 according to the first embodiment, the switching between the standard photographing position and the macro photographing position can be carried out, and the projecting area in the optical axis direction is further reduced.

As described above, according to the first to the third embodiments, the conditions of the cam member (cam portion 23, 43) fixed to the lens frame 12 and the cam are changed by the rotational movement of the switching member (switching levers 24, 42) around the adjusting shaft (adjusting screw 21, 31, 41), so that the position of the lens frame 12 in the optical axis direction is switched. At this time, since the position of the adjusting shaft with respect to the mounting cradle 13 is fixed by the position standard member, the lens frame can be adjusted so as to be arranged in a suitable image forming position. The switching member, therefore, switches the position of the lens frame 12 between the standard photographing position and the macro photographing position. Since the adjusting shaft is provided to an outer portion of the cylindrical portion (lens frame holding portion 13b) of the mounting cradle, the member for adjusting the position of the lens frame in the optical axis direction is not provided to the entire outer periphery of the cylindrical portion. As a result, in the lens unit, the switching between the standard photographing position and the macro photographing position can be carried out, and the projecting area in the optical axis direction is further reduced.

Further, the mounting cradle has at least one corner on the outside of the cylindrical portion, and the adjusting shaft is desirably provided to the corner. In the case where an image sensor or the like whose projecting shape in the optical axis direction is quadrangular is used, a quadrangular portion for mounting the image sensor is required on the mounting cradle. Its corner is on the outside of the cylindrical portion. With this constitution, therefore, a new space for the adjusting shaft is not necessary, and thus the projecting area can be further reduced.

It is desirable that the spring, which is inserted into the adjusting shaft and presses the cam member against the switching member, is provided.

With this constitution, when the convex portions of the cam member and the switching member shift from each other, they are pressed against each other by the biasing force of the spring. The switching, therefore, between the standard photographing position and the macro photographing position can be carried out securely.

In the first and the second embodiments, the cover member which is engaged with the end of the adjusting shaft opposite to the mounting cradle is fixed to the mounting cradle. The position standard member, the switching member and the cam member are arranged on the cover member in this order from the mounting cradle side. The spring is arranged between the cam member and the cover member. With such a constitution, the cam member is pressed against the switching member by the spring. The position of the cam member can be switched against the biasing force of the spring by the rotational movement of the switching member.

Further, in the third embodiment, the cam member, the switching member and the position standard member are arranged in this order from the mounting cradle side. The spring is arranged between the cam member and the mounting cradle. With such a constitution, the cam member is pressed against the switching member by the spring. The position of the cam member can be switched against the biasing force of the spring by the rotational movement of the switching member.

It is preferable that the position standard member can adjust the position of the adjusting shaft in the axial direction at least at the time of manufacturing.

This embodiment is only an example, and thus the present invention is not limited to this. The present invention, therefore, can be naturally improved and modified in various forms within the range which does not depart from the scope of the present invention.

For example, the arrangement positions of the switching lever and the cam portion can be changed in the respective embodiments. The convex cam may be provided therebetween.

For example, in the first or the second embodiment, the head portion of the adjusting screw 21 is enlarged sufficiently in comparison with the diameter of the spring 22, so that the cover 14 can be omitted.

For example, in the respective embodiments, the lens position adjusting section and the spring are arranged coaxially, but the spring is not necessarily provided coaxially. For example, only the spring is provided to one place of the four corners of the mounting cradle 13 where the lens position adjusting section is not provided. In this case, the spring may be provided to a plurality of places. A biasing member other than the spring may be provided as long as it can bias the lens frame 12 to a predetermined direction. In the above embodiments, the switching lever 24 serves as the switching member and as a lever for operating the switching member, but the switching member and the lever are provided separately, and they may be connected by a gear or the like.

The shapes of lens group 11, the lens frame 12 and the like in the above embodiments are only examples, and thus the present invention is not limited to them.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A lens unit, comprising:
a mounting cradle;
a cylindrical portion in an optical axis direction fixed to said mounting cradle;
a lens frame held to said cylindrical portion to be capable of moving to the optical axis direction;
a lens fixed to said lens frame;
an adjusting shaft provided to an outside of said cylindrical portion in parallel with the optical axis direction;
a position standard member that is provided to said adjusting shaft and whose position with respect to said mounting cradle is fixed;
a cam member that is fixed to said lens frame and is engaged with said adjusting shaft; and
a switching member provided between the position standard member and the cam member so as to be capable of rotationally moving about said adjusting shaft,
wherein a position of said lens frame in the optical axis direction is switched by the rotational movement of said switching member.

2. A lens unit according to claim 1, wherein said mounting cradle has at least one corner on the outside of the cylindrical portion, and said adjusting shaft is provided to the corner.

3. A lens unit according to claim 1, further comprising a spring which is inserted into said the adjusting shaft and presses the cam member against said switching member.

4. A lens unit according to claim 3, further comprising a cover member which is fixed to said mounting cradle and engaged with the end of said adjusting shaft opposite to said mounting cradle,
wherein said position standard member, said switching member, and the cam member are arranged on the cover member in this order from the mounting cradle side, and
wherein said spring is arranged between said cam member and said cover member.

5. A lens unit according to claim 3, wherein said cam member, said switching member, and said position standard member are arranged on the cover member in this order from the mounting cradle side, and
wherein said spring is arranged between said cam member and said mounting cradle.

6. A lens unit according to claim 1, wherein said position standard member adjusts the position of said adjusting shaft in the axial direction.

7. An image pickup apparatus, comprising:
a mounting cradle;
an image pickup device held to said mounting cradle;
a cylindrical portion in an optical axis direction fixed to said mounting cradle;
a lens frame held to said cylindrical portion to be capable of moving to the optical axis direction;
a lens fixed to said lens frame;
an adjusting shaft provided to an outside of said cylindrical portion in parallel with the optical axis direction;

a position standard member that is provided to said adjusting shaft and whose position with respect to said mounting cradle is fixed;

a cam member that is fixed to said lens frame and is engaged with said adjusting shaft; and a switching member provided between the position standard member and the cam member so as to be capable of rotationally moving about said adjusting shaft, wherein a position of said lens frame in the optical axis direction is switched by the rotational movement of said switching member.

8. A lens unit, comprising:

a mounting cradle;

a cylindrical portion in an optical axis direction fixed to said mounting cradle;

a lens frame held to said cylindrical portion to be capable of moving to the optical axis direction;

a lens fixed to said lens frame;

an adjusting shaft provided to an outside of said cylindrical portion in parallel with the optical axis direction;

a position standard member that is provided to said adjusting shaft and whose position with respect to said mounting cradle is fixed;

a cam member that is fixed to said lens frame and is engaged with said adjusting shaft;

a switching member provided between the position standard member and the cam member so as to be capable of rotationally moving about said adjusting shaft; and a spring which presses said cam member against said switching member.

9. A lens unit according to claim 8, wherein a position of said lens frame in the optical axis direction is switched by the rotational movement of said switching member.

10. A lens unit according to claim 8, wherein said mounting cradle has at least one corner on the outside of the cylindrical portion, and said adjusting shaft is provided to the corner.

11. A lens unit according to claim 8, wherein said spring is inserted into said the adjusting shaft.

12. A lens unit according to claim 11, further comprising a cover member which is fixed to said mounting cradle and engaged with the end of said adjusting shaft opposite to said mounting cradle, wherein said position standard member, said switching member, and the cam member are arranged on the cover member in this order from the mounting cradle side, and wherein said spring is arranged between said cam member and said cover member.

13. A lens unit according to claim 11, wherein said cam member, said switching member, and said position standard member are arranged on the cover member in this order from the mounting cradle side, and wherein said spring is arranged between said cam member and said mounting cradle.

14. A lens unit according to claim 8, wherein said position standard member adjusts the position of said adjusting shaft in the axial direction.

* * * * *